United States Patent [11] 3,607,941

| [72] | Inventor | Denis M. Bailey |
| | | E. Greenbush, N.Y. |
| [21] | Appl. No. | 740,473 |
| [22] | Filed | June 27, 1968 |
| [45] | Patented | Sept. 21, 1971 |
| [73] | Assignee | Sterling Drug Inc. |
| | | New York, N.Y. |

[54] 2-(LOWER-ALKOXY)-2-PHENYLALKANAMIDOXIMES
5 Claims, No Drawings

[52] U.S. Cl. .................................................. 260/564 G, 260/501.14, 424/326
[51] Int. Cl. ..................................................... C07c 123/00
[50] Field of Search ........................................ 260/564 G

[56] References Cited
UNITED STATES PATENTS
3,115,525  12/1963  D'Al. ............................ 260/564

FOREIGN PATENTS
876,079  8/1961  Great Britain ................ 260/564

OTHER REFERENCES
Eloy et al., Chemical Reviews, Vol. 62, pp. 157 (1962)

*Primary Examiner*—Howard T. Mars
*Assistant Examiner*—Gerald A. Schwartz
*Attorneys*—Elmer J. Lawson, B. Woodrow Wyatt, Thomas L. Johnson, Robert K. Bair, R. Clifford Bourgeois, William G. Webb and Roger T. Wolfe

ABSTRACT: A 2-(lower-alkoxy)-2-phenylalkanamidoxime, having hypoglycemic activity, is prepared by reacting a 2-(lower-alkoxy)-2-phenylalkanenitrile with hydroxylamine. The intermediate 2-(lower-alkoxy)-2-phenylalkanenitrile is prepared preferably by first reacting a benzaldehyde with a tri-(lower-alkyl) orthoformate to form the aldehyde di-(lower-alkyl) acetal, reacting the latter with an acyl halide to form the corresponding a-halobenzyl lower-alkyl ether and reacting said ether with an alkali cyanide to yield said intermediate nitrile.

2-(LOWER-ALKOXY)-2-PHENYLALKANAMIDOXIMES

This invention relates to compositions of matter known in the art of chemistry as 2-phenylalkanamidoximes and to their preparation.

The invention in its composition aspect resides in the compounds having the formula I

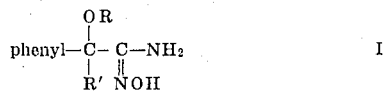

where R is lower-alkyl, and R' is hydrogen, lower-alkyl or lower-alkenyl. The compounds of this composition aspect of the invention having formula I, when tested according to standard pharmacological evaluation procedures in animals, have been found to possess the inherent applied use characteristics of having hypoglycemic activity.

The substitution of simple moieties on the benzene ring of phenyl in the compounds of the invention does not adversely affect the pharmacological activity of the compounds and such compounds are the full equivalents of the compositions herein claimed. Illustrative but not limitative examples of such moieties are lower-alkyl, lower-alkoxy, halo, trihalomethyl, lower-alkylmercapto, lower-alkylsulfonyl, di(lower-alkyl)amino, amino, hydroxy, nitro and benzyloxy. Such substituent moieties can be in any available position of the benzene ring and where more than one, preferably no more than three, can be in any position relative to one another. Also, phenyl in the compounds of the invention can be replaced by other simple ring moieties without affecting the pharmacological activity of the compounds and such compounds are the full equivalents of the compositions herein claimed. Illustrative but not limitative examples of such other simple ring moieties are naphthyl, indanyl, biphenylyl, cyclohexenyl and cyclohexyl.

The compounds of formula I having napthyl in place of phenyl not only have hypoglycemic activity as indicated above but also have hypotensive activity. These compounds, when tested according to standard pharmacological evaluation procedures in animals, have been found to possess the inherent applied use characteristics of exerting an antihypertensive effect in animal organisms, thereby indicating their utility as hypotensive agents.

The terms "lower-alkyl" and "lower-alkoxy," as used herein, respectively, are preferably alkyl and alkoxy radicals having from one to six carbon atoms which can be arranged as straight or branched chains, among which are, for purposes of illustration but without limiting the generality of the foregoing, methyl, ethyl, n-propyl, isopropyl, sec-butyl, isobutyl and n-hexyl for lower-alkyl; and, by methoxy, ethoxy, n-propoxy, isopropoxy, isobutoxy, n-amoxy and n-hexoxy for lower-alkoxy.

The term "lower-alkenyl," as used herein, are preferably alkenyl radicals having from three to six carbon atoms, among which are, for purposes of illustration but without limiting the generality of the foregoing, 2-propenyl (allyl), 2-butenyl, 2-methyl-2propenyl, 2-hexenyl, and the like.

invention sought to be patented in its process aspect, is described as residing in the process of the preparation of the composition aspect of the invention, that is, the compound of formula I, which comprises reacting a 2-(lower-alkoxy)-2-phenylalkanenitrile of the formula II

with hydroxylamine. The their products of formula I of the invention are useful in the free base form or in the form of their acid-addition salts, and both forms are within the purview of the invention, and are considered to be one and the same invention. The acid-addition salts are simply a more convenient form for use; and, in practice, use of the salt form inherently amounts to use of the base form. The acids which can be used to prepare the acid-addition salts are preferably those which produce, when combined with the free base, pharmaceutically acceptable salts, that is, salts whose anions are relatively innocuous to the animal organism in pharmaceutical doses of the salts, so that the beneficial properties inherent in the free base are not vitiated by side effects ascribable to the anions; in other words, the latter do not substantially affect the pharmaceutical properties inherent in the cations. Appropriate pharmaceutically acceptable salts within the scope of the invention are preferably those derived from mineral acids such as hydrochloric acid, hydrobromic acid, hydriodic acid, nitric acid, phosphoric acid, sulfamic acid, and sulfuric acid; and organic sulfonic acids such as methanesulfonic acid, ethanesulfonic acid, benzenesulfonic acid, p-toluenesulfonic acid, naponic acid (1,4-naphthalenedisulfonic acid), and the like, giving the hydrochloride, hydrobromide, hydriodide, nitrate, phosphate, sulfamate, sulfate, methanesulfonate, ethanesulfonate, benzenesulfonate, p-toluenesulfonate and naponate, respectively.

The acid-addition salts are prepared preferably by reacting the free base and acid in an organic solvent, e.g., ethanol, 2-propanol, acetone, etc., in which the case the salt separates directly or can be obtained by concentration of the solution.

The nature of the starting materials, mode of synthesis, results of elementary analyses, examination of the final products of formula I by infrared and nuclear magnetic resonance spectographic analyses, all taken together, confirm the molecular structure assigned to these compounds.

The manner and process of making and using the invention will now be generally described so as to enable a person skilled in the art of medicinal chemistry to make and use the same, as follows:

PREPARATION OF INTERMEDIATES

The intermediate 2-(lower-alkoxy)-2phenylalkanenitriles (formula II), -phenylethanenitrile examples of which are known, e.g., 2-ethoxy-2-phenylethanenitrile (or α-ethoxyphenylacetonitrile), 2-methoxy-2-phenylethanenitrile and 2-ethoxy-2-(4-methoxyphenyl)ethanenitrile are prepared by generally known methods. For example, one method found convenient utilized three steps by first reacting the corresponding generally known benzaldehyde with a tri-(lower-alkl) orthoformate of the formula HC(OR)₃ to form the corresponding aldehyde di-(lower-alkyl) acetal of the formula phenyl-CH(OR)₂, which is then reacted with a lower-alkanoyl halide, e.g., acetyl chloride, to form the corresponding α-halobenzyl lower-alkyl ether of the formula phenyl-CHCl(OR) which in turn is reacted with an alkali cyanide, e.g., sodium cyanide, to yield the α-(lower-alkoxy)phenylacetonitrile of the formula phenyl-CH(OR)CN, that is, the compound of formula II where R' is hydrogen. Reaction of this compound with a lower-alkylating e.g., e.g. a lower-alkyl halide, in the presence of a strong base, e.g., potassium tertiary-butoxide, sodamide, etc., yields the compound of formula II where R' is lower-alkyl.

The compound of formula II where R' is hydrogen also can be prepared by the generally known method of heating the corresponding α-(lower-alkoxy)phenylacetamide of the formula phenyl-CH(OR)CONH₂ with a dehydrating agent effective to convert carboxamides to nitriles, e.g., thionyl chloride. Said α-(lower-alkoxy)phenylacetamides are prepared from the corresponding generally known α-(lower-alkoxy)phenylacetic acids by the generally known procedures of converting said acids to their acid chlorides by reaction with thionyl chloride and reacting said acid chlorides with ammonia to form said carboxamides.

PREPARATION OF FINAL PRODUCTS

The final products, as illustrated by formula I, are prepared by reacting 2-(lower-alkoxy)-2-phenylalkanenitriles of formula II with hydroxylamine. The reaction is preferably carried out by heating the reactants at about 50 to 150° C., preferably at about 60 to 100° C., in a suitable solvent, e.g., a lower-alkanol such as ethanol, dimethylformamide, and the like. The hydroxylamine is conveniently added to the reaction as its hydrochloride along with a suitable base, e.g., sodium carbonate, to liberate hydroxylamine in free base form.

The best mode contemplated for carrying out the invention will now be set forth as follows:

A. ALDEHYDE DI-(LOWER-ALKYL) ALKYL) ACETALS

1. Benzaldehyde diethyl acetal - A mixture 106 g. of benzaldehyde, 161 g. of triethyl orthoformate, 138 g. of ethanol and 2 g. of finely powdered ammonium chloride was refluxed on a steam bath for 15 minutes; the excess reactants were then distilled off at about 85° C.; and the remaining material was distilled in vacuo. After a forerun of ethyl orthoformate (b.p., 40–60° C. at 10 mm.), 160 g. of benzaldehyde diethyl acetal was collected at 97–99° C./10 mm.

2. 1-Naphthaldehyde dimethyl acetal - To 134 g. of 1-naphthaldehyde in a 1 liter round bottom flask was added successively 120 g. of trimethyl orthoformate, 120 ml. of methanol and two drops of concentrated hydrochloric acid. After the initial vigorous reaction had subsided, the solution was refluxed for 30 minutes and then the excess reagents were removed by distilling under reduced pressure. The residue was distilled *in vacuo* to yield 160 g. of 1-naphthaldehyde dimethyl acetal, b.p. 94° C. at 0.12 mm.

3. 2,6-Dichlorobenzaldehyde diethyl acetal, 143 g., was prepared by stirring a mixture containing 100 g. of 2,6-dichlorobenzaldehde, 90 g. of triethyl orthoformate, 90 ml. of ethanol and 0.5 ml. of concentrated hydrochloric acid for 45 minutes at room temperature 25–30° C.), for 45 minutes on a steam bath and then 1 hour at room temperature, followed by removal of the excess reactants by distilling in vacuo at 70° C. using a water pump. The product was used in the next step without any further purification.

4. 2-Chlorobenzaldehyde diethyl acetal, 835 g., as a clear pale yellow oil, was prepared as in EXAMPLE A–3 using 500 g. of 2-chlorobenzaldehyde.

5. 4-Chlorobenzaldehyde diethyl acetal, 168.5 g., b.p. 126–129°C. at 15 mm., was prepared by refluxing for 30 minutes a mixture containing 140.6 g. of 4-chlorobenzaldehyde, 178 g. of triethyl orthoformate, 175 ml. of ethanol and 1 ml. of concentrated hydrochloric acid; distilling off in vacuo (at 90° C. using a water pump) the solvent and excess reactants; and, distilling the residue under high vacuum.

6. Indane-5-carboxaldehyde diethyl acetal, 281 g., b.p. 139–140°C., at 9 mm., was prepared as in example A–5 using 200 g. of indane-5carboxaldehyde.

7. 1-Naphthaldehyde diethyl acetal, 197 g., b.p. 100–101 at 0.16–0.17 mm., was prepared as in example A–2 using 156.2 g. of 1-naphthaldehyde.

8. 3-Fluorobenzaldehyde diethyl acetal, 140.8 g. b.p. 91–95° C. at 10 mm., was prepared as in example A–5 using 124 g. of 3-fluorobenzaldehyde.

9. 4-Isopropylbenzaldehyde diethyl acetal, 198.1 g., was prepared as in example A–3 using 148 g. of 4-isopropylbenzaldehyde.

10. 4-Methoxybenzaldehyde diethyl acetal, 422 g., was prepared as in example A–9 using 242 ml. of 4-methoxybenzaldehyde (anisic aldehyde).

11. Benzaldehyde dimethyl acetal, 146.2 g., b.p. 98–103° C. at 31–37 mm., was prepared as in example A–5 using 106.1 g. of benzaldehyde.

12. 4-Methylbenzaldehyde diethyl acetal, 387 g., was prepared as in example A–3 using 240 g. of 4-methylbenzaldehyde.

13. 2-Naphthaldehyde diethyl acetal, 102.4 g., b.p. 105–108°C. at 0.02 mm., was prepared as in example A–5 using 90 g. of 2-naphthaldehyde.

14. 3,4-Dichlorobenzaldehyde diethyl acetal - A mixture containing 175 g. of 3,4-dichlorobenzaldehyde, 178 g of triethyl orthoformate, 100 ml. of absolute ethanol and 100 ml. of 5 percent ethanolic hydrogen chloride solution was stirred under reflux for 30 minutes. The reaction mixture was then cooled and neutralized with sodium ethoxide solution prepared from 2.3 g. of sodium and 100 ml. of absolute ethanol. The solvent was distilled off in vacuo; the residue was cooled in an ice bath and diluted with 300 ml. of benzene; and, the resulting mixture was poured into 200 ml. of cooled 10 percent aqueous sodium hydroxide solution. The benzene layer was separated, washed with 200 ml. water, dried over anhydrous sodium sulfate, filtered through anhydrous sodium sulfate and heated on a steam bath in vacuo to remove any solvent. The residue was then distilled in vacuo to yield a 201.7 g. fraction of 3,4-dichlorobenzaldehyde diethyl acetal, b.p. 73–88° C. at 0.185–0.310 mm.

15. Benzaldehyde di-n-propyl acetal - A mixture containing 210 g. of benzaldehyde dimethyl acetal, 1 liter of n-propanol and 1 drop of concentrated hydrochloric acid was fractionally distilled through a 9" column packed with glass helices. After removing the methanol at atmospheric pressure, then removing the excess n-propanol using a rotary evaporator, the product, benzaldehyde di-n-propyl acetal b.p. 242–245° C., was distilled at atmospheric pressure.

16. Benzaldehyde di-n-butyl acetal, 247.3 g., b.p. 112–115° C. at 1.7 mm., was prepared using the procedure of Stewart et al. [JACS 77, 1098(1955)] using 202 ml. of benzaldehyde, 600 ml. of n-butanol and two drops of concentrated hydrochloric acid.

17. 2-Methoxybenzaldehyde diethyl acetal, 105 g., was prepared as in example A–3 using 65 g. of 2-methoxybenzaldehyde.

18. 4-Benzyloxybenzaldehyde diethyl acetal - To a suspension containing 100 g. of 4-benzyloxybenzaldehyde, 90 g. of triethyl orthoformate and 250 ml. of absolute ethanol was added 1 ml. of concentrated hydrochloric acid. After allowing the reaction mixture to stand for 1 hour at about 25–30° C., 30 g. of solid potassium carbonate was added and the resulting mixture was stirred for 5 minutes and filtered. The filtrate was evaporated in vacuo to yield 135 g. of 4-benzyloxybenzaldehyde diethyl acetal.

19. 3-Cyclohexenealdehyde diethyl acetal - To a stirred solution containing 128.5 g. of 3-cyclohexenealdehyde (1,2,3,6-tetrahydrobenzaldehyde) and 250 ml. of absolute ethanol was added successively a few mg. of p-toluenesulfonic acid and 220 ml. of triethyl orthoformate, the latter at such a rate to maintain the reaction temperature at about 38° C. (aided by cooling in an ice bath). The reaction mixture was stirred at room temperature for 17 hours, warmed on a steam bath to reflux (reaction temperature 78° C.) for 2 hours, cooled and distilled in vacuo to remove the ethanol and excess triethyl orthoformate. The remaining viscous yellow oily residue was dissolved in 500 ml. of ether and the solution extracted successively with 10 percent aqueous sodium hydroxide solution three times and then with water. The ether solution was then dried over anhydrous magnesium sulfate and the ether removed by distilling in vacuo, thereby yielding 208 g. of 3-cyclohexeneadehyde diethyl acetal.

20. 3-Fluro-4-methoxybenzaldehyde diethyl acetal, 192 g., was prepared as in example A–3 using 122 g. of 3-flouro-4-methoxybenzaldehyde.

B. ALPHA-HALOBENZYL LOWER-ALKYL ETHERS

1. α-Chlorobenzyl ethyl ether - A mixture containing 157 g. of benzaldehyde diethyl acetal, 180 g. of acetyl chloride and 1.5 ml. of thionyl chloride was stirred at room temperature (25–30° C.) overnight (about 15 hours). The volatile liquids (excess acetyl chloride and ethyl acetate) were removed under reduced pressure and the residue was fractionated in vacuo to yield 139.5 g. of α-chlorobenzyl ethyl ether, b.p. 58–60° C. at 0.2 mm.

2. α, 3,4-Trichlorobenzyl ethyl ether, 218.2 g., was prepared as in example B-1 using 229.5 g. of 3,4-dichlorobenzaldehyde diethyl acetal, 393 ml. of acetyl chloride and 3.5 ml. of thionyl chloride. The ether, not distilled, was obtained after removal of volatile liquids from the reaction mixture and heating the residue at 100° C. and 0.07 mm.

3. 1-Naphthylchloromethyl methyl ether - A mixture containing 160 g. of 1-naphthaldehyde dimethyl acetal and 280 ml. of acetyl chloride in a flask equipped with a reflux condenser and a calcium chloride tube was allowed to stand at room temperature overnight. The excess acetyl chloride and the methyl acetate formed during the reaction were removed in vacuo at 30° C. to yield 160 g. of 1-naphthylchloromethyl methyl ether.

4. α-Chlorobenzyl methyl ether 131.7 g., was prepared as in example B-3 using 146.2 g. of benzaldehyde dimethyl acetal and 408 ml. of acetyl chloride.

5. α4-Dichlorobenzyl ethyl ether - To a stirred mixture containing 280 ml. of acetyl chloride and 2 ml. of thionyl chloride was added dropwise at about 30° C. 168.5 g. of 4-chlorobenzaldehyde diethyl acetal over a period of about 40 minutes. The reaction mixture was then allowed to stand overnight at room temperature. The solvent was removed in vacuo at a temperature below 40° C. and then the residue was heated in vacuo at 50° C. for about 30 minutes to yield 152 g. of α,4-dichlorobenzyl ethyl ether.

6. α, 2,6-Trichlorobenzyl ethyl ether, 139 g., was prepared as in example B-5 using 143 g. of 2,6-dichlorobenzaldehyde diethyl acetal, 200 ml. of acetyl chloride and 100 ml. of thionyl chloride. A 15 g. sample distilled at 82–83° C. at 0.06 mm.

7. α,2-Dichlorobenzyl ethyl ether, 826 g., was prepared as in example B-5 using 835 g. of 2-chlorobenzaldehyde diethyl acetal, 1260 ml. of acetyl chloride and 2 ml. of thionyl chloride.

8. α-Chloro-3-flourobenzyl Chloro-3-fluorobenzyl ethyl ether - To 330 ml. of acetyl chloride containing 1 ml. of ethanol was added dropwise with stirring over a period of about 1 hour 184 g. of 3-flurobenzaldehyde diethyl acetal, keeping the temperature between about 25–30° C. by intermittent cooling with an ice bath. The solution was allowed to stand overnight at room temperature and then heated in vacuo below 40° C. to remove the excess acetyl chloride and ethyl acetate. The residue was then heated in vacuo at 50° C. for an hour to yield 175 g. of α-chloro-3-fluorobenzyl ehtyl ether.

9. α-Chloro-4-methoxybenzyl ethyl ether, 401 g., was prepared as in example B-8 using 422 g. of 4-methoxybenzaldehyde diethyl acetal, 357 ml. of acetyl chloride and 1 ml. of ethanol.

10. α-Chloro-2-naphthylmethyl ethyl ether, 101 g., was prepared as in example B-8 using 106 g. of 2-naphthaldehyde diethyl acetal and 82 ml. of acetyl chloride.

11. α-Chloro-1-naphthylmethyl ethyl ether 187 g., was prepared as in example B-8 but using 2 ml. of thionyl chloride together with 350 ml. of acetyl chloride and 196.5 g. of 1-naphthaldehyde diethyl acetal.

12. α-Chloro-4isopropylbenzyl ethyl ether, 189 g., was prepared as in example B-8 but using 198 g. of 4-isopropylbenzaldehyde diethyl acetal, 160 ml. of acetyl chloride and 1 ml. of ethanol.

ml. 13 α-Chlorobenzyl n-propyl ether, 92.4 g., was prepared as in example B-8 using 104 g. of benzaldehyde di-n-propyl acetal and 178 ml. of acetyl chloride.

14. α-Chlorobenzyl n-butyl ether, 198 g., was prepared as in example B-8 using 236 g. of benzaldehyde di-n-butyl acetyl, 178 ml. of acetyl chloride and a few drops of ethanol.

15. α-Chloro-4-methylbenzyl ethyl ether, 185 g., was prepared as in example B-8 using 194 g. of 4-methyl-benzaldehyde diethyl acetal, 248 ml. of acetyl chloride and 3 ml. of thionyl chloride.

16. α-Chloro-5-indanylmethyl ethyl ether, 104 g., was prepared as in example B-8 using 281 g. of indane-5-carboxaldehyde diethyl acetal and 400 ml. of acetyl chloride.

17. α-Chloro-2-methoxybenzyl ethyl ether, 96. g. was prepared as in EXAMPLE B-5 using 105 g. of 2-methyxybenzaldehyde diethyl acetal, 160 ml. of acetyl chloride and 1 ml. of thionyl chloride.

18. 4-Benzyloxy-α-chlorobenzyl ethyl ether was prepared as in example B-8 using 135 g. of 4-benzyloxybenzaldehyde diethyl acetal, 106 ml of acetyl chloride and 1 ml. of thionyl chloride.

19. α-Chloro-1,2,3,6-tetrahydrobenzyl ethyl ether, 156 g., was prepared as in example B-8 using 198 g. of 1,2,3,6-tetrahydrobenzaldehyde diethyl acetal, 700 ml. of acetyl chloride and 1 ml. of thionyl chloride.

20. α-Chloro-3-flouro-4-methoxybenzyl ethyl ether, 176 g., was prepared as in example B-8 using 192 g. of 3-flouro-4-methoxybenzyldehyde diethyl acetal, 500 g. of acetyl chloride and 1 ml. of thionyl chloride.

C. ALPHA-(LOWER-ALKOXY) PHENYLACETONITRILES FROM ALPHA-HALOBENZYL LOWER-ALKYL ETHERS

1. α-Ethoxyphenylacetonitrile - To a suspension containing 37.8 g. of sodium cyanide in 400 ml. of dimethylformamide was added dropwise with stirring over a period of about 45 minutes, keeping the mixture below 30° C., a solution containing 105 -ethoxyphenlacetonitrile, g. of α-chlorobenzyl ethyl ether in 100 ml. of dimethylformamide. The mixture was stirred for an additional 30 minutes; the solids were filtered off; the solvent was distilled off under reduced pressure; and, the residue was fractionally distilled to yield 66 g. of α-ethoxyphenylacetonitrile, b.p. 114–116° C. at 10 mm.

2. α-Ethoxy-2,6-dichlorophenylacetonitrile, 63 g., b.p. 97° C. at 0.05 mm., was prepared as in example C-1 using 36 g. of sodium cyanide suspended in 250 ml. of dimethylformamide and 124 g. of α,2,6-dichlorobenzyl ethyl ether and 40 ml. of dimethylformamide. Before distillation, infusorial earth was added to the reaction mixture; the mixture was filtered; and the filter cake was washed with benzene; and, the filtrate was evaporated on a rotary evaporator, removing the last of the dimethylformamide through a fractionating column using a water pump.

3. α-Ethoxy-2-chlorophenylacetonitrile - To a stirred suspension containing 204 g. of sodium cyanide in 1500 ml. of dimethylformamide was added over a period ml. about 2 hours, keeping the reaction mixture at about 20–25° C., 676 g. of α,2-dichlorobenzyl ethyl ether and the resulting mixture was stirred for an additional hour. To the reaction mixture was added 800 ml. (dry volume) of infusorial earth and the mixture was filtered through infusorial earth. The filter pad was washed with benzene. The combined filtrate and washings were evaporated in vacuo at about 20–40 mm. and 70° C. The residue was taken up with 1500 ml. of 1:1 benzene-ether and the resulting solution treated with 2 liters of ice water containing 200 ml. of 10 percent aqueous sodium hydroxide solution. The aqueous layer was drained off and discarded. The organic layer was washed with two 500 ml. portions of water and with 250 ml. portions of brine, and then dried overnight over anhydrous sodium sulfate. The solvent was distilled off in vacuo and the residue fractionally distilled to yield 379.2 g. of α-ethoxy-2-chlorophenylacetomitrile, b.p. 93–97° C. at 1.4 mm.

4. α-Ethoxy-4-chlorophenylacetonitrile, 88.5 g., b.p. 103–105° C. at 1.3 mm. was prepared as in example C-2 using 49 g. of sodium cyanide in dimethylformamide and 152 g. of α-dichlorobenzyl ehtyl ether.

5. α-Methoxy-1naphthylacetonitrile, 68 g., b.p. 124–126° C. at 0.27–0.28 mm., was prepared as in example C–3 using 49 g. of sodium cyanide in 500 ml. of dimethylformamide and 160 g. of α-chloro-1-naphthylmethyl methyl ether in 250 ml. of dimethylformamide.
6. α-3,4-dichlorophenylacetonitrile, 24.5 g. at 78–90° C. and 0.015–0.025 mm. and 14.9 g. at 100–108° C. and 0.05 mm., was prepared as in example C–1 using 50.5 g. of sodium cyanide suspended in 545 ml. of dimethylformamide and 198.2 g. of α,3,4-trichlorobenzyl ethyl ether in 140 ml. of dimethylformamide.
7. α-Methoxyphenylacetonitrile, 55.5 g., b.p. 59–68.5° C. at 0.03–0.14 mm., was prepared as in example C–1 using 51.5 g. of sodium cyanide in 553 ml. of dimethylformamide and 131.7 g. of α-chlorobenzyl methyl ether in 141 ml. of dimethylformamide.
8. α-n-Propoxyphenylacetonitrile, 57.3 g., b.p. 100–103° C. at 2 mm., was prepared as in example C–3 but using only ether (no benzene) to extract the product and using 30.6 g. of sodium cyanide in 200 ml. of dimethylformamide and 92.4 g. of α-chlorobenzyl n-propyl ether.
9. α-n-Butoxyphenylacetonitrile, 122.9 g., b.p. 105.5–107.5° C. at 1.5 mm., was prepared as in example C–8 using 61.2 g. of sodium cyanide in 500 ml. of dimethylformamide and 198 g. of n-butyl α-chlorobenzyl ether.
10. α-Ethoxy-3-fluorophenylacetonitrile, 54.6 g., b.p. 75–78° C. at 0.17 mm., was prepared as in example C–8 using 57 g. of sodium cyanide in 600 ml. of dimethylformamide and 175 g. of α-chloro-3-fluorobenzyl ethyl ether.
11. α-Ethoxy-4-methoxyphenylacetonitrile, 299.5 g., b.p. 118–125° C. at 1.5 mm., was prepared as in example C–8 using 122.5 g. of sodium cyanide in 900 ml. of dimethylformamide and 401 g. of α-chloro-4-methoxybenzyl ethyl ether.
12. α-Ethoxy-2-naphthylacetonitrile, 40.44 g., b.p. 119°–121° C. at 0.09 mm., was prepared as in example C–8 using 28.2 g. of sodium cyanide in 350 ml. of dimethylformamide and 101 g. of α-chloro-2-naphthylmethyl ethyl ether. The product solidified on standing and was found to melt at 52–54° C.
13. α-Ethoxy-4-isopropylphenylacentonitrile, 109.6 g., b.p. 86–92° C. at 0.10 mm., was prepared as in example C–8 using 55 g. of sodium cyanide in 400 ml. of dimethylformamide and 189 g. of α-chloro-4-isopropylbenzyl ethyl ether.
14. α-Ethoxy-1-naphthylacentonitrile, 97.3 g., b.p. 135–139° C. at 0.09–0.12 mm., was prepared as in example C–8 using 50 g. of sodium cyanide in 850 ml. of dimethylformamide and 182 g. of α-chloro-1-naphthylemethyl ethyl ether.
15. α-Ethoxy-4-methylphenylacetonitrile, 89 g. 133–135° C. at 9 mm., was prepared as in example C–8 using 61 g. of sodium cyanide in 300 ml. of dimethylformamide and 172 g. of α-chloro-4-methylbenzyl ethyl ether.
16. α-Ethoxy-5-indanylacentonitrile, 104 g., b.p. 122–126° C. at 1.4 mm., was prepared as in example C–8 using 78.5 g. of sodium cyanide in 650 ml. of dimethylformamide and 269.8 g. of α-chloro-5-indanylmethyl ethyl ether. Before fractionating, the reaction mixture was diluted with 1300 ml. of water, the mixture extracted three times with benzene, the extract washed with water, dried over anhydrous potassium carbonate and evaporated in vacuo to remove the benzene.
17. 8 -Ethoxy-2-methoxyphenylacetonitrile, b.p. 111–113° C. at 1.3 mm., was prepared in example C–8 using 30 g. of sodium cyanide in 250 ml. of dimethylformamide and 96 g. of α-chloro-2-methoxybenzyl ethyl ether.
18. 4-Benzyloxy-α-ethoxyphenylacetonitrile - To a stirred mixture containing 30 g. of sodium cyanide in 250 ml. of dimethylformamide was added dropwise over a period of 45 minutes 4-benzyloxy-α-chlorobenzyl ethyl waterand prepared from 135 g. of 4-benzyloxybenzaldehyde diethyl acetal (example B–18), maintaining the reaction temperature at about 20–25° C. by slight external cooling. The reaction mixture was stirred for an additional 3 hours, infusorial earth was added and the mixture filtered through infusorial earth. The filter cake was washed successively with dimethylformamide and benzene. The combined filtrate and washings were evaporated to a low volume and was taken up in a mixture of benzene, ether and water. The layers were separated and the organic layer was washed three times with water and then stirred vigorously for 1 hour with 100 ml. of IN hydrochloric acid. The layers were separated and the organic layer was washed with aqueous sodium bicarbonate solution, dried over anhydrous potassium carbonate while treating with decolorizing charcoal, the mixture filtered and the filtrate evaporated in vacuo to remove the ether and benzene. The residue was distilled under reduced pressure to yield 53.7 g. of 4-benzyloxy-α-ethoxyphenylacetonitrile, b.p. 155–158° C. at 0.03–0.04 mm.
19. α-Ethoxy-3cyclohexenylacetonitrile, 13.6 g., b.p. 97–99° C., at 8 mm., was prepared as in Example C–3 using 23 g. of sodium cyanide, 400 ml. of dimethylformamide, 80 g. of α-chloro-1,2,3,6-tetrahydrobenzaldehyde ethyl ether and ether instead of benzene-ether in the workup.
20. 3-Chloro-α-ethoxyphenylacetonitrile, b.p. 89–91° C. at 0.14 mm., 67.11 g., was prepared as in example C–8 using 53.9 g. of sodium cyanide, 300 ml. of dimethylformamide and 146 g. of α,3-dichlorobenzyl ethyl ether.
21. α-Ethoxy-3-fluro-4-methoxyphenylacentonitrile, b.p. 125–129°C. at 1.4 mm., 81.3 g., was prepared as in example C–8 using 49 g. of sodium cyanide, 500 ml. of dimethylformamide and α-chloro-3-fluro-4-methoxybenzyl ethyl ether.

Following the procedure described in example C, e.g., C–1, C–3 or C–8 using corresponding molar equivalents of the appropriate α-halobenzyl lower-alkyl ether, the following α-(lower-alkoxy)phenylacetonitriles are prepared: 3-fluoro-α-n-propoxyphenylacetonitrile using α-chloro-3fluorobenzyl n-propyl ether; 2,4-dibromo-α-ethoxyphenylacetonitrile using 2,4-dibromo-α-chlorobenzyl ethyl ether; α,3,4-triethoxyphenylacetonitrile using α-chloro-3,4-diethoxy-benzyl ethyl ether; αethoxy-3-diethylaminophenylacetonitrile using αmethlmercaptophenylacetonitrile 3-diethylaminobenzyl ethyl ether; αn-butoxy-4-methylmercaptophenylacetonitrile using α-chloro-4-methylmercaptobenzyl n-butyl ether; α-ethoxy-4-methylsulfonylphenylacetonitrile using α-chloro-4-methylsulfonyl benzyl ethyl ether; α-ethoxy-4biphenylylacetonitrile using α-chloro-4-biphenylylmethyl ethyl ether; 4-chloro-α-n-hexoxyphenylacetonitrile using α,4-dichlorobenzyl n-hexyl ether; α-ethoxy-3-fluro-4-methoxyphenylacetonitrile using α-chloro-3-fluro-4-methoxybenzyl ethyl ether; 4-chloro-α-ethoxy-2-nitrophenylacetonitrile using α,4-dichloro-2-nitrobenzyl ethyl ether. The foregoing intermediate α-halobenzyl lower-alkyl ethers are prepared in two steps starting with the appropriate corresponding aldehyde and following the procedures described above in Example A, e.g., A–1, A–3, A–15 or A–16, and Example B, e.g., B–1, B–2, B–5 or B–8, first to form the corresponding aldehyde di-(lower-alkyl) acetals and then the corresponding α-halobenzyl lower-alkyl ethers.

D. ALPHA-(LOWER-ALKOXY)PHENYLACETIC ACIDS, ESTERS AND AMIDES

1. α-Methoxyphenylacetamide - A solution of 30 g. of ethyl α-chlorophenylacetate in 100 ml. of 1.6M methanolic sodium methylate was refluxed for 3 hours, the solvent stripped off and the residue partitioned between ether and cold dilute hydrochloric acid. Distillation of dried ether solution yielded 16 g. of ethyl α-methoxyphenylacetate, b.p. 130–132° C. at 19 mm. This ester was dissolved in 300 ml. of methanol which previously had been saturated with ammonia and the solution was allowed to remain at room temperature for three days. The solvent was removed and the residue recrystallized from benzene to yield 7.5 g. of α-methoxyphenylacetamide, m.p. 111°–112°C.

2. α-Methoxyphenylacetamide - To a stirred solution containing 53.5 g. of benzaldehyde, 89.5 g. of chloroform and 100 ml. of methanol, maintained at 40°–45° C., there was added dropwise a solution of 165 g. of potassium hydroxide in 400 ml. of methanol. After standing at room temperature for 14 hours, the reaction mixture was stripped of solvent and the residual material was dissolved in water. The aqueous solution was filtered through decolorizing charcoal, and the filtrate was acidified and extracted with ether. Distillation of dried ether solution yielded 44 g. of α-methoxyphenylacetic acid, b.p. 130–134°C. at 0.7 mm. and m.p. 68–70 C. after recrystallizing from benzene petroleum ether. 30 grams of α-methoxyphenylacetic acid was added to a mixture of 30 ml. of thionyl chloride and 100 ml. of chloroform, and the mixture was refluxed for 8 hours. The volatile liquids were removed by distilling in vacuo and the residue was dissolved in a small amount of acetone. The acetone solution was added slowly to ammonium hydroxide containing ice. The reaction mixture was distilled in vacuo and the remaining dry residue was recrystallized from aqueous isopropyl alcohol using decolorizing charcoal to yield 15.8 g. of α-methoxyphenylacetamide, m.p. 109–111°C.

3. α-Methoxy-α-3-trifluoromethylphenylacetamide - A solution of 10.4 g. of 3-trifluoromethylbenzaldehyde and 17.2 g. of bromoform in 50 ml. of methanol was stirred at 0°–5° C. while a solution of 18 g. of potassium hydroxide in 100 ml. of methanol was added over a period of 90 minutes. The mixture was allowed to remain overnight in a melting ice bath and then most of the alcohol was removed by ether extraction and the solution acidified. The precipitated oily material was extracted and distilled to yield 8 g. of α-methoxy-3-trifluoromethylphenylacetic acid, b.p. 120–122° C. at 0.4 mm. This acid was converted into its acid chloride by refluxing a solution of 12 g. of the acid in 25 ml. of thionyl chloride for 2 hours and removing the excess thionyl chloride by vacuum-distillation. The acid chloride was added slowly to ammonium hydroxide containing ice and the semisolid amide was collected and recrystallized twice from benzene-petroleum ether to yield 4.5 g. of α-methoxy-3trifluoromethylphenylacetamide m.p. 96°–97° C.

4. α-n-Butoxyphenylacetamide - To a stirred solution of 32.4 g. of benzaldehyde, 81 g. of bromoform and 100 ml. of n-butanol kept at about 5–10° C. was added dropwise a solution prepared by reacting 34.5 g. of sodium with 700 ml. of nn-butanol. After remaining overnight, the mixture was distilled to dryness and the residue taken up in water. The aqueous solution was clarified by ether extract, acidified and the precipitated oily acid was extracted with ether and fractionated to yield 14.1 g. of αn-butoxyphenylacetic acid, b.p. 130–132° C. at 0.4 mm. This acid (14 g.) was combined with 25 ml. thionyl chloride and 50 ml. of benzene and refluxed for 2 hours. The solvent was removed and the residue was added to iced ammonium hydroxide to yield 7 g. of αn-butoxyphenlacetamide, m.p. 84–85°C., after recyrstallization from n-heptane.

5. 4-Chloro-α-methoxyphenylacetamide, m.p. 133–134° C., was prepared in 37 percent yield as in Example D–3 using corresponding molar equivalent quantities of 4-chlorobenzaldehyde, bromoform and methanol to form 4-chloro-α-methoxyphenylacetic acid, b.p. 148–149° C. at 0.5 mm. and m.p. 82–84° C. and converting the acid to its acid chloride using thionyl chloride and reacting the acid with ammonia to yield the amide.

6. α-Ethoxyphenylacetamide, b.p. 140–144° C. at 0.4 mm. and m.p. 72–74° C. after recrystallization from n-heptane, was obtained as in Example D–2 first using corresponding molar equivalent quantities of benzaldehyde, chloroform and ethanol in the presence of potassium hydroxide to give a 37 percent yield of α-ethoxyphenylacetic acid, b.p. 137–179°C. at 0.7 mm; and then successively converting the acid to its acid chloride with thionyl chloride and then to its amide with ammonia.

7. α-Methoxy-4biphenylylacetic acid - To a stirred suspension of 25 g. of 4-biphenylcarboxaldehyde, 37.8 g. of bromoform and 150 ml. of methanol stirred at 0–5° C. was added dropwise a solution of 48 g. of 85 percent potassium hydroxide in 230 ml. of methanol. About one-half of the potassium hydroxide-methanol solution was added over a 30 minute period and the remainder was added more rapidly over a 15 minute period. The reaction mixture was stirred in a melting ice bath for about 20 hours and evaporated in vacuo to remove the methanol and water. The residue was taken up with a mixture of ethyl acetate and water. The aqueous layer was separated and acidified. The acidic solution was extracted with chloroform and the remaining acidic solution evaporated in vacuo. The remaining solid residue was crystallized first from benzene and then from isopropyl alcohol to yield 13.6 g. of α-methoxy-4 -biphenylylacetic acid, m.p. 130.5 –133° C.

E. ALPHA-(LOWER-ALKOXY)PHENYLACETONITRILES FROM ALPHA-(LOWER-ALKOXY)PHENYLACETAMIDES

1. α-Methoxyphenylacetonitrile - A solution of 7.5 g. of α-methoxy-α-phenylacetamide in 30 ml. of thionyl chloride was refluxed for 2 hours and distilled to yield 3.9 g. of α-methoxy-α-phenylacetonitrile, b.p. 120–c 123° C. at 19 mm.

2. α-Methoxy-3-trifluoromethylphenylacetonitrile, 2.5 g., b.p. 115–120° C. at 17 mm., was prepared as in Example E–1 using 4 g. of α-methoxy-3trifluormethylphenylacetamide and 20 ml. of thionyl chloride.

3. α-n -Butoxyphenylacetonitrile, 4.9 g., b.p. 146–148° C. at 16 mm., was prepared as in Example E–1 using 7 g. of α-n-butoxy-α- phenylacetamide and 20 ml. of thionyl chloride.

4. 4-Chloro-α-methoxyphenylacetonitrile, b.p. 99–103° C. at 0.7 mm., was prepared in 59 percent yield by dehydration of α-methoxy-α-4-chlorophenylacetamide by heating it with thionyl chloride in benzene until the theoretical quantity of water was removed.

5. α-Ethoxyphenylacetonitrile, b.p. 101–106 C. at 0.4 mm., was prepared as in example E-4 in 73 percent yield by heating α-ethoxyphenylacetamide with thionyl chloride in benzene.

F. OTHER 2-(LOWER-ALKOXY)-2-PHENYLALKANENITRILES

1. -Ethoxy-2-phenylbutanenitrile - To a stirred solution of 32.2 g. of α-ethoxyphenylacetonitrile in 100 ml. of tetrahydrofuran, kept at about 5–10° C. using an ice bath, was added dropwise under nitrogen 27 g. of potassium tertiary-butoxide as a 10 percent w/v solution in tetrahydrofuran. After the addition, which took 30 minutes, the reaction mixture was stirred an additional 15 minutes in ice; the ice bath was removed and the mixture stirred an additional 15 minutes. To the reaction mixture kept at about 15–20° C. was added dropwise over a period of about 15 minutes 39 g. of ethyl iodide. The ice bath was removed and the reaction mixture stirred for 45 minutes. Then enough glacial acetic acid was added until the reaction mixture was no longer basic to wet pH paper (about 0.5 ml.). The mixture was then filtered through sintered glass and the residual salts thoroughly washed with ether. The combined washings and filtrate were distilled in vacuo to yield 23.8 g. of 2-ethoxy-2-phenylbutanenitrile, b.p. 113–114° C. at 12 mm.

2. 2-(4-Chlorophenyl) -2-ethoxybutanenitrile, b.p. 128–129°C. at 9 mm., 22.3 g., was prepared as in example F-1 by first adding a solution of 39.0 g. of 4-chloro-α-ethoxyphenylacetonitrile in 30 ml. of tetrahydrofuran dropwise over a period of 45 minutes to a solution containing 28.0 g. of potassium tertiary-butoxide in 200 ml. of tetrahydrofuran, maintaining the mixture at about 5–117 10° C.; stirring the mixture with cooling for another hour; then adding dropwise over a period of about thirty minutes to the stirred solution cooled to about 10° C. a solution of 42.1 g. of ethyl iodide in 20 ml. of tetrahydrofuran; and working up the reaction mixture as in Example F-1.

Following the procedure described above in Example F-1 and using corresponding molar equivalent quantities of the appropriate α-(lower-alkoxy)phenylacetonitrile and lower-alkyl or lower-alkenyl halide, the following 2(lower-alkoxy) 2 -phenylakanenitriles are obtained: 2 -ethoxy-2phenylpropanenitrile using α-ethoxyphenylacetonitrile and methyl iodide; 2-(4-chlorophenyl)-2-ethoxypentanenitrile using 4-chloro-α-ethoxyphenylacetonitrile and n-propyl iodide; 2-(3-chlorophenyl -2-ethoxyhexanenitrile using 3-chloro-α-ethoxyphenylacetonitrile and n-butyl bromide; 2-ethoxy-2-phenyloctanenitrile using αethoxyphenylacetonitrile and n-hexyl bromide; and, 2-ethoxy-2-(3-flurophenyl) -4pentenenitrile using α-ethoxy-3-fluorophenylacetonitrile and allyl bromide.

G. 2-(LOWER-ALKYL)-2PHENYLAKANAMIDOXIMES 1. αethyl -Ethoxy-α- (1-naphthyl)acetamidoxime - A mixture containing 5.96 g. of α-ethoxy-α-(1-naphthyl) acrtonitrile 3.92 g. of hydrochloride, 6.56 g. of anhydrous sodium carbonate and 600 ml. of 95 percent ethanol was refluxed with stirring for 6 hours and then heated in vacuo to remove the ethanol. The residue was taken up in water and ethyl acetate and the two layers separated. The water layer was extracted with ethyl acetate. The combined ethyl acetate extracts were washed with brine, dried over anhydrous magnesium sulfate and heated in vacuo to remove the ethyl acetate. The remaining solid was recrystallized from benzene, using decolorizing charcoal, to yield 5.86 g. of α-ethoxy-α-(1-naphtyl)- acetamidoxime, m.p. 147–149° C.

2. α-(4-chlorophenyl)-α-ethoxyacetamidoxime 4-Chlorophenyl) mixture containing 19.57 g. of 4-chloro-αethoxyphenylacetonitrile, 12.9 g. of hydroxylamine hydrochloride, 23.4 g. of anhydrous sodium carbonate and 2000 ml. of 95 percent ethanol was refluxed for four hours and then worked up as in Example G-1. The product, and oil, weighed 21.12 g. The 21 g. of product in base form tertiary dissolved in isopropyl acetate and the solution added a solution containing 17.5 g. of p-toluenesulfonic acid monohydrate in dry isopropyl acetate. The mixture was heated to boiling for two minutes and then cooled in an ice bath. The separated solid was collected, recrystallized from acetonitrile using decolorizing charcoal and dried in vacuo for 16 hours at 80° C. to yield 30.7 g. of α-(4-chlorophenyl)-α-ethoxyacetamidoxime as its p-toluenesulfonate, m.p. 156–157° C.

3. α-(2,6-Dichlorophenyl)-α-ethoxyacetamidoxime, m.p. 173.5–176.5≡~ C. 12.9 g., was prepared as in Example G-1 using 15.0 g. of 2, 6-dichloroαethoxyphenylacetonitrile, 9.05 g. of hydroxylamine hydrochloride, 15.2 g. of anhydrous sodium carbonate, and 1500 ml. of 95 percent ethanol, a reflux period of 3 hours and a recrystallization from ethyl acetate.

4 α-(2Chlorophenyl)-α-ethoxyacetamidoxime, m.p. 100°–102° c., 9.59 g., was prepared a in example G-1 using 15.0 g. of 2-chloroα-ethoxyphenylacetonitrile, 10.6 g. of hydroxylamine hydrochloride, 17.9 g. of anhydrous sodium carbonate, 1500 ml. of 95% ethanol, a reflux period of 2 hours and recrystallization from isopropyl alcohol.

5. α-(3,4-Dichlorophenyl)-α-ethoxyacetamidoxime, m.p. 79.81° C., 15.5 g., was prepared as in example G-1 using 17.3 g. of 3,4 -dichloro-α-ethoxyphenylacetonitrile, 10.4 g. of hydroxylamine hydrochloride, 17.5 g. of anhydrous sodium carbonate, 1800 ml. of 95 percent ethanol, a reflux period of 2 hours and recrystallization from cyclohexane.

6. α-Ethoxy-α-phenylacetamidoxime, as its p-toluene-sulfonate, m.p. 128–130° C., 22.3 g., was prepared as in Example G-2 using 16.1 g. of α-ethoxyphenylacetonitrile, 13.9 g. of hydroxylamine hydrochloride, 23.4 g. of anhydrous sodium carbonate, 1500 ml. of 95 percent ethanol, a reflux period of 2 hours and recrystallization from isopropyl acetate.

7. α-Phenyl -α-n -propoxyacetamidoxime, m.p. 98–99.5° C., 14.66 g., was prepared in Example G-1 using 17.5 g. of α-n- propoxyphenylacetonitrile, 13.8 g. of hydroxylamine, hydrochloride, 23.4 of anhydrous sodium carbonate, 1800 ml. of 95 percent ethanol, a reflux period of two hours and recrystallization from ether.

8. α-Ethoxyl -α(p-totyl) acetamidoxime, as its p-toluenesulfonate, m.p. 149–151° C., 15.2 g., was prepared as in Example G-2 using 17.5 g. of α-ethoxy-p -tolylacetonitrile, 13.8 g. of hydroxylamine hydrochloride, 23.4 g. of anhydrous sodium carbonate, 1800 ml. of 95 percent ethanol, a reflux period of 4 hours and recrystallization from isopropyl acetate using decolorizing charcoal. 9. α-Ethoxy -α-(4-methoxyphenylacetamidoxime, as its p-toluenesulfonate, m.p. 130–132° C., 30.8 g., was prepared as in Example G-2 using 19.2 g. of α-ethoxy-4-methoxyphenylacetonitrile, 13.8 g. of hydroxylamine hydrochloride, 23.4 g. of anhydrous sodium carbonate, 1750 ml. of 95 percent ethanol, a reflux period of 4 hours and recrystallization from isopropyl acetate.

10. α-Ethoxy -α(2-naphthyl)acetamidoxime, m.p. 140–144° C., 9.7 g., was prepared as in Example G-1 using 10 g. of α-ethoxyl -α-(2-naphthyl)acetonitrile, 6.6 g. of hydroxylamine hydrochloride, 11 g. of anhydrous sodium carbonate, 1000 ml. of 95 percent ethanol, a reflux period of 3 and one-half hours and recrystallization from isopropyl acetate using decolorizing charcoal.

Following the procedure described in Example G-1 using a corresponding molar equivalent quantity of the appropriate 2-(lower-alkyl)-2phenylalkanenitrile in place of α-ethoxy- α-(1-naphthyl)acetonitrile, there are obtained the following 2-(lower-alkyl)-2phenylalkanamidoximes: α-methoxy-α-(1-naphthyl)acetamidoxime using α-methoxy-α-(1-naphthyl)acetonitrile; α-phenyl-α-methoxyacetamidoxime using αmethoxyphenylacetonitrile; α-n-butoxy-α-phenylacetamidoxime using αn-butoxyphenylacetonitrile; α-ethoxy-α-(3-flurophenyl) acetamodioxime using α-ethoxy-3fluorophenylacetonitrile; α-ethoxyα-(2 naphthyl)acetamidoxime using α-ethoxy-α-(2-naphthyl)acetonitrile; α-ethoxy-α-(4-isopropylphenyl)acetamidoxime using α-ethoxy-4isopropylphenylacetonitrile; α-ethoxy-α-(5-indanyl)-acetamidoxime using α-ethoxy-α-(5-indonyl)acetonitrile; α-ethoxy-α-(2-methoxyphenyl)acetamidoxime using α-ethoxy-2-methoxyphenylacetonitrile; α-(4benzyloxyphenyl)-α-ethoxyacetamidoxime using 4-benzyloxy-α-ethoxyphenylacetonitrile; α-(3-chlohexenyl)-α-ethoxyacetamidoxime using α-(3-cyclohexenyl)α-ethoxyacetonitrile; α-(3-chlorophenyl)-α-ethoxyacetamidoxime using 3-chloro-α-ethoxyphenylacetonitrile; α-ethoxy-α-(3-fluro-4-methoxyphenyl)acetanidoxime using α-ethoxy-3-fluro-4-methoxyphenlacetonitrile; α-(2,4-dibromophenyl)-α-ethoxyacetamidoxime using 2,4-dibromo-α-ethoxyphenylacetonitrile; α-ethoxy-α-(3,4-diethoxyphenyl)acetamidoxime using α, 3,4triethoxyphenylacetonitrile; α-ethoxy-α-(3-diethylaminophenyl)acetamidoxime using α-ethoxy-3diethylaminophenylacetonitrile; α-n-butoxy-α-(4-methylmercaptophenyl)acetamidoxime using α-n-butoxy-4mercaptophenylacetonitrile; α-ethoxy-α-(4-methylsulfonylphenyl)-acetamidoxime using α-ethoxy-4-methylsulfonylphenylacetonitrile; α-(4-biphenylyl)-α-ethoxyacetamidoxime α-(-phenlpropanamidoime using 2-biphenylyl)-œthoxyacetonitrile; -(4-chlorophenyl)-α-n-hexoxyacetamidoxime using 4-chloro-α-n-hexoxyphenylacetonitrile; α-(4-chloro-2-nitrophenyl)-œthoxyacetamidoxime using α-(4-chloro-2-nitrophenyl)-α-ethoxyacetonitrile; α-methoxy-α-(3-trifluoromethylphenyl)acetamidoxime using α-methoxy-3-trifluoromethylphenylacetonitrile; α-(4-chlorophenyl)-α-methoxyacetamidoxime using 4-chloro-α-methoxyphenylacetonitrile; 2-ethoxy-2-phenylbutanamidoxime using 2-ethoxy-2-phenylbutanenitrile; 2-(4-chlorophenyl)-2-ethoxybutanamidoxime using 2-(4-chlorophenyl)-2-ethoxybutanenitrile; 2-ethoxy-2-phenylpropanamidoxime using 2-ethoxy-2-phenylpropanenitrile; 2-(4-chlorophenyl)-2-ethoxypentanmidoxime using 2-(4-chlorophenyl)-2-ethoxypentanenitrile; 2-(3-chlorophenyl)-2-ethoxyhexanamidoxime using 2-(3-chlorophenyl)-2-ethoxyhexanenitrile; 2-ethoxy-2-phenyloctanamidoxime using 2-ethoxy-2phenyloctanenitrile; 2-ethoxy-2-(3-fluorophenyl)-4-pentenamidoxime using 2-ethoxy-2-(3-fluorophenyl)-4-pentenenitrile; α-methoxy-α-(2-naphthyl)acetamidoxime using α-methoxy-α-(2-naphthyl)acetonitrile; 2-ethoxy-2-(2-naphthyl)-butanamidoxime using 2-ethoxy-2-(2-naphthyl)butanenitrile; and, 2-ethoxy-2-(2-naphthyl)-4-pentenamidoxime using 2-ethoxy-2-(2-naphthyl)-4-pentenenitrile.

Also prepared by the indicated known procedures are: α-ethoxy-α-(4-hydroxphenyl)acetamidoxime by catalytically hydrogenating α-(4-benzyloxyphenyl)-α-ethoxyacetamidoxime in absolute ethanol using 10 percent palladium on charcoal as the catalyst; α-(3-cyclohexyl)-α-ethoxyacetamidoxime by catalytically hydrogenating α-(3-cyclohexenyl)-α-ethoxyacetamidoxime in absolute ethanol using platinum dioxide as the catalyst, and, α-(2-amino-4-chlorophenyl)-α-ethoxyacetamidoxime in the form of its dihydrochloride by catalytically hydrogenating α-(4-chloro-2-nitrophenyl)-α-ethoxyacetamidoxime in absolute ethanol containing two molar equivalents of hydrogen chloride with 10 percent palladium on charcoal as the catalyst. to The hypoglycemic activity of the compounds of the invention was measured by the percent decrease in blood glucose 25 from premedicated blood glucose levels in fasted rats generally according to the procedure of Dulin et al., Proc. Soc. Exptl. & Med. 107, 245(1961), wherein glucose primed rats were bled from the tail vein at 1, 2, 3 and 5 hours following medication. Hypoglycemic activity is expressed as the percent decrease in blood glucose from the control animals at the same hour. When tested by this procedure, the compounds of the invention were found to have hypoglycemic activity when administered at oral dose levels between about 25 and 250 mg./kg.

The hypotensive activity of the compounds of the invention having naphthyl in place of phenyl was determined in unanesthetized renal hypertensive rats using the photoelectric tensometer foot method described by Kersten et al., J. Lab. Clin. Med. 32, 1090 (1947). The method of testing for antihypertensive or hypotensive activity is described briefly as follows: The compound is administered orally preferably in the form of its pharmaceutically-acceptable acid-addition salt, e.g., sulfate or p-toluenesulfonate salt, as a solution or suspension in distilled water with the aid of 1 percent gum tragacanth by stomach tube or subcutaneously to groups of three renal hypertensive rats at each of two to four different dose levels graduated at 0.3 to 0.9 logarithmic intervals. The systolic blood pressure was determined for each of the three rats per dose level before medication and at intervals of 1, 2, 4, 5, 24, and 48 hours after medication. For the control readings, the rats were considered hypertensive if the systolic blood pressure was 160 mm. Hg or greater, and for the postmedication readings, the systolic blood pressure was considered within normotensive range at 130 mm. Hg or less. The blood pressure reading for each rat was compared with these two criteria at each interval and judged either normotensive or not normotensive, and the dose reducing the blood pressure to a normotensive level in 50 percent of animals was defined as the Approximate Effective Dose$_{50}$ (AED$_{50}$). When tested by the above procedure, the compounds of the invention were found to have hypotensive activity, e.g., α-ethoxy-α-(1-naphthyl)acetamidoxime was found to have an oral AED$_{50}$ of 30 mg./kg.

The actual determination of the numerical biological data definitive for a particular compound is readily obtained according to the above standard test procedures, by technicians versed in pharmacological test procedures, without any need for any extensive experimentation.

The compounds alcoholc the invention can be prepared for use by dissolving under sterile conditions a salt form of the compounds in water (or an equivalent amount of nontoxic acid if the free base is used), or in a physiologically compatible aqueous medium such as saline, and stored in ampuls for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Also, the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advantageously in combination with such hypotensive agents, e.g., reserpine, diazoxide, pentolinium, hydralazine, phentolamine, methyldopate, hydrochlorothiazide, chlorothiazide, and the like. Similarly, when used as hypoglycemic agents, they are formulated and used in the same manner as conventional hypoglycemic agents and also can be used in combination with such hypoglycemic agents, e.g., phenoformin, tolbutamide, tolazamide, and the like.

I claim:

1. A compound having the formula

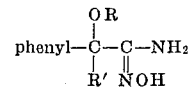

where R is lower-alkyl, R' is hydrogen, lower-alkyl or lower-alkenyl and where phenyl may be substituted by from one to three substituents selected from lower-alkyl, lower-alkoxy, halo, trihalomethyl, lower-alkylmercapto, lower-alkylsulfonyl, di(lower-alkyl)amino, amino, hydroxy, nitro or benzyloxy.

2. α-Phenyl-α-n-propoxyacetamidoxime according to claim 1 where R is n-propyl and R' is hydrogen.

3. α-(2-Chlorophenyl)-α-ethoxyacetamidoxime.

4. α-Ethoxy-α-(p-tolyl)acetamidoxime.

5. α-Ethoxy-α-(4-methoxyphenyl)acetamidoxime.

UNITED STATES PATENT OFFICE
CERTIFICATE OF CORRECTION

Patent No. 3,607,941      Dated September 21, 1971

Inventor(s) Denis M. Bailey

It is certified that error appears in the above-identified patent and that said Letters Patent are hereby corrected as shown below:

In the Abstract, third from the last line, "a-" should read -- α- --. Column 1, line 58, before "invention" insert -- The --; line 67, "their" should read -- final --. Column 2, line 21, omit "the" (first occurrence); line 35, omit "-phenylethanenitrile" and in place thereof insert -- representative --; line 43, "alkl)" should read -- alkyl) --; line 52, omit "e.g." (first occurrence) and in place thereof insert -- agent --. Column 3, line 7, omit "ALKYL)" (second occurrence); line 9, between "mixture" and "106 g." insert -- containing --; line 33, "25-30°C.)" should read -- (25-30°C.) --. Column 4, line 1, omit "30"; line 63, "adehyde" should read -- aldehyde --; line 64, "fluro" should read -- fluoro --; line 65, "flouro" should read -- fluoro --. Column 5, line 22, "5 α4-" should read -- 5. α,4- --; line 40, "flouro" should read -- fluoro -- and delete "Chloro-3-fluorobenzyl" (second occurrence); line 43, "fluro" should read -- fluoro --; line 51, "ehtyl" should read -- ethyl --; line 67, " ml. 13" should read -- 13. --. Column 6, line 1, "248" should read -- 284 --; line 7, "-methyx-" should read -- -methox- --; line 19, "-flouro-" should read -- -fluoro- --; line 20, "-flouro-" should read -- -fluoro- --; line 32, omit "-ethoxyphenlacetonitrile,"; line 52, omit "ml." (second occurrence) and in place thereof insert -- of --; line 71, "mitrile" should read -- nitrile --; line 75, "α-dichlorobenzyl ehtyl" should read -- α,4-dichlorobenzyl ethyl --. Column 7, line 6, "α-3,4" should read -- α-ethoxy-3,4 --; line 43, "isopropylphenylacentonitrile" should read -- isopropylphenylacetonitrile --; line 48, "acento" should read -- aceto --; line 53, "naphthylemethyl" should read -- naphthylmethyl --; line 58, "acento" should read -- aceto --; line 67, "8-Ethoxy" should read -- α-Ethoxy --; line 68, "prepared in" should read -- prepared as in --; line 74, omit "waterand" and in place thereof insert -- ether --. Column 8, in each of lines 31 and 34, "-fluro-" should read -- -fluoro- --; lines 45-46, omit "amethlmercaptophenylacetonitrile" and in place thereof insert -- α-chloro- --; in each of lines 53 and 54,

UNITED STATES PATENT OFFICE
CERTIFICATE OF CORRECTION

Patent No. 3,607,941　　　　　　　　　Dated September 21, 1971

Inventor(s) Denis M. Bailey　　　　　　　PAGE -2

It is certified that error appears in the above-identified patent and that said Letters Patent are hereby corrected as shown below:

"-fluro-" should read -- -fluoro- --. Column 9, line 16, "70 C." should read -- 70°C. --; line 53, "nn-butanol" should read -- n-butanol --; line 62, "αn-butoxyphenlacetamide" should read -- α-n-butoxyphenylacetamide --. Column 10, line 33, "120-c 123°C." should read -- 120-123°C. --; line 56, "-Ethoxy" should read -- 2-Ethoxy --. Column 11, line 8, "5-117 10°C." should read -- 5-10°C. --; line 19, "akane" should read -- alkane --; line 26, "fluro" should read -- fluoro --; line 29, "2PHENYLAKAN" should read -- 2-PHENYLALKAN --; line 30, "αethyl-Ethoxy" should read -- α-Ethoxy --; line 31, "acrto" should read -- aceto --; line 32, between "of" and "hydrochloride" insert -- hydroxylamine --; line 43, "naphtyl" should read -- naphthyl --; lines 44-45, omit "4-Chlorophenyl)" and in place thereof insert -- A --; line 51, omit "tertiary" and in place thereof insert -- was --; line 52, between "added" and "a" insert -- to --; line 62, omit "=~" and in place thereof insert -- ° --. Column 12, line 17, omit the comma after "hydroxylamine"; line 22, "Ethoxyl" should read -- Ethoxy --; "totyl" should read -- tolyl --; line 29, "phenylacet" should read -- phenyl)acet --; line 38, "ethoxyl" should read -- ethoxy --; line 52, "fluro" should read -- fluoro --; line 52, "acetamodioxime" should read -- acetamidoxime --; line 59, "indonyl" should read -- indanyl --; line 62, "chlo" should read -- cyclo --; line 66, "fluro" should read -- fluoro --; line 66, "acetanidoxime" should read -- acetamidoxime --; line 67, "fluro" should read -- fluoro --; line 67, "phenl" should read -- phenyl --; line 73, "4mercap-" should read -- 4-methylmercap- --. Column 13, lines 1-3, omit "α(-phenlpropanamidoime using 2-biphenylyl)-αethoxyaceonitrile; -(4-chlorophenyl)" and in place thereof insert -- using α-(4-biphenylyl)-α-ethoxyacetonitrile; α-(4-chlorophenyl) --; line 6, "acento" should read -- aceto --; line 27, "hydrox" should read -- hydroxy --"; line 39, omit "to"; line 41, omit "25" and in place thereof insert -- levels --. Column 14, line 22, omit "alcoholc" and in place thereof insert -- of --; line 44, "phenoformin" should read -- phenformin --.

Signed and sealed this 15th day of August 1972.

(SEAL)
Attest:

EDWARD M. FLETCHER, JR.　　　　　　　ROBERT GOTTSCHALK
Attesting Officer　　　　　　　　　　Commissioner of Patents